United States Patent [19]

Wedel, Jr.

[11] Patent Number: 4,535,460

[45] Date of Patent: Aug. 13, 1985

[54] METHOD AND APPARATUS TO FILTER PULSED RF SIGNALS

[76] Inventor: John O. Wedel, Jr., 4218 Southfield Rd., Ellicott City, Md. 21043

[21] Appl. No.: 576,093

[22] Filed: Feb. 1, 1984

[51] Int. Cl.³ .............................................. H04B 1/10
[52] U.S. Cl. .................................... 375/104; 455/225; 455/308; 328/115
[58] Field of Search .......................... 375/94, 102, 104; 455/218, 222, 225, 296, 305, 308; 307/350, 362; 329/104, 178; 328/115, 116; 364/574; 358/165

[56] References Cited

U.S. PATENT DOCUMENTS

| | | | |
|---|---|---|---|
| 3,218,556 | 11/1965 | Chisholm | 455/296 |
| 3,474,235 | 10/1969 | Singer | 328/115 |
| 3,621,125 | 11/1971 | Parker | 358/165 |
| 3,621,401 | 11/1971 | Young, Jr. | 375/102 |
| 3,671,867 | 6/1972 | Schwarz | 455/308 |
| 3,953,802 | 4/1976 | Morris et al. | 375/104 |
| 4,414,512 | 11/1983 | Nelson | 307/262 |

Primary Examiner—Benedict V. Safourek

[57] ABSTRACT

A method and apparatus for receiving and detecting pulsed RF signals within a first frequency band. Incoming pulsed RF signals are supplied to a linear amplifier which amplifies any of the signals within a broader second frequency band. The pulsed RF output signals of the amplifier are supplied to an in-band signal detection circuit controlling switches in the outputs of a first video detector and a frequency discriminator which are also supplied with the amplifier output signals, so that output video and frequency signals are provided only for pulsed RF signals within the first frequency band. The in-band signal detection circuit includes a limiter for hard-limiting the amplifier output signals, a bandpass filter for filtering the hard-limited signals and passing those within the first frequency band, a second video detector for detecting the envelope of the filtered hard-limited signals, and a comparator for generating an control signal to close the switches at the outputs of the first video detector and the frequency discriminator whenever the detected waveform produced by the second video detector exceeds a threshold value indicating a pulsed RF signal within the first frequency band.

14 Claims, 4 Drawing Figures

METHOD AND APPARATUS TO FILTER PULSED RF SIGNALS

RIGHTS OF THE GOVERNMENT

The invention described herein may be manufactured, used, and licensed by or for the United States Government for governmental purposes without payment to me of any royalty thereon.

BACKGROUND OF THE INVENTION

The invention relates generally to a method and apparatus for filtering pulsed RF signals. More particularly, the invention relates to a method and apparatus for improving the frequency selectivity of a linear receiver by rejecting large, out-of-band, pulsed RF signals while preserving a large instantaneous dynamic range of the receiver.

In known linear receivers, pulsed RF signals are normally sorted in frequency by bandpass filtering. However, satisfactory rejection of large, out-of-band, pulsed RF signals may not be possible in receivers having a large instantaneous dynamic range through the use of bandpass filters. When large out-of-band pulsed RF signals occur, there may be sufficient sidelobe energy in receiver bandpass filter to cause detection. In some receivers, the energy within the filter passband is used for frequency discrimination; thus, the frequency of the out-of-band signal will also appear as if it is in-band.

In the past, various types of guard band filtering have been used in RF receivers to reject large, out-of-band signals. For example, U.S. Pat. No. 3,218,556, issued Nov. 16, 1965 to Chisholm describes a spectrum centered receiver which passes the bandpass frequencies of interest to the output only when an auxiliary receiver detecting signals on bands adjacent to or on either side of the main passband detects an energy level less than that of the main passband. U.S. Pat. No. 3,953,802, issued Apr. 27, 1976 to Morris et al, describes an adjacent channel rejector for a receiver in which the output of a high gain amplifier receiving an incoming signal is applied to both a wideband filter/demodulator and a narrowband filter/demodulator. The amplitudes of the signals from these two filters/demodulators are compared, and the output of the main receiver is inhibited whenever the wideband signal is greater than the narrowband signal. U.S. Pat. No. 3,621,401, issued Nov. 16, 1971 to Young, Jr., describes a frequency spectrum responsive noise reduction system for a receiver in which the output of a wideband regulating amplifier receiving an incoming signal is supplied to both a notch filter and a pass filter. The outputs of these filters are detected and the amplitudes compared with preadjusted reference threshold levels, and the signal of the main receiver is only allowed to pass the two receiver output when the amplitudes of the signal from both filters fall within satisfactory ranges.

OBJECTS AND SUMMARY OF THE INVENTION

Therefore, it is a primary object of the invention to provide a simple method and apparatus for filtering pulsed RF signals.

It is a further object of the invention to provide a method and apparatus for a linear receiver to provide frequency filtering on pulsed out-of-band RF signals while preserving a large instantaneous dynamic range of the receiver.

In the method according to the invention, pulsed RF signals are received and are broadband filtered to pass any pulsed RF signals which are within a selected broad frequency band. In a preferred embodiment, this broadband filtering is accomplished by amplifying those pulsed RF signals which are within the broad frequency band. The broadband filtered pulsed RF signals are then analyzed to determine whether these signals are within a selected narrow frequency band which is included within the broad frequency band. If the filtered pulsed RF signal is determined to be within the narrow frequency band, the envelope of the broadband filtered pulsed RF signals is detected to generate output video signals. The broadband filter pulsed RF signals are analyzed to determine whether they are within the narrow frequency band by hard-limiting these signals, detecting the envelope of the hard-limited signals to generate first video signals, and comparing the first video signals with a threshold valve which is selected such that only first video signals generated from pulsed RF signals within the selected narrow frequency band will exceed the selected threshold valve. As a result of this comparison, output video signals will only be generated when the first video signal exceeds the threshold valve, that is, when the broadband filtered pulsed RF signals fall within the selected narrow frequency band. In similar manner, the frequency of the broadband filtered pulse RF signals can be measured whenever the first video signal exceeds the threshold signal.

In a preferred embodiment of the invention, pulsed RF signals are received and amplified by a linear receiver with a large instantaneous dynamic range. The amplifier serves as a broadband filter in that it only amplifies the pulsed RF signals which are within the frequency bandwidth of the amplifier. A video detector is connected in series with a first switching device between the output of the linear amplifier and a video output of the receiver, so that the detector supplies video signals corresponding to the envelope of the pulsed RF signals generated by the linear amplifier whenever the first switching device is closed or rendered conductive. Similarly, a frequency discriminator is connected in series with a second switching device between the amplifier output and a frequency output of the receiver, so that a frequency signal indicating the frequency of the pulsed RF output signals of the amplifier is provided to the frequency output of the receiver by the frequency discriminator whenever the second switching device is closed or rendered conductive.

The first and second switching devices are controlled by a gate signal which is applied to these two switches and which renders these switches conductive whenever the pulsed RF output signals of the linear amplifier fall within a selected narrow frequency band which is included within the broader frequency bandwidth of the amplifier. The control circuit for generating this gate signal includes a signal limiter for converting the pulsed RF output signals of the linear amplifier into hard-limited pulsed RF signals having either a first or second instantaneous value, a bandpass filter for filtering the hard-limiting pulsed RF signals and passing those signals falling within the selected narrow frequency band included within the bandwidth of the linear amplifier, a video detector circuit for generating first video signals corresponding to the envelope of the filtered hard-limited pulsed RF signals, and a signal comparator for comparing the first video signals with a selected threshold valve and generating the gate signal whenever the first video signals exceed the threshold valve.

BRIEF DESCRIPTION OF THE DRAWINGS

The invention will be better understood, and further objects, features, and advantages thereof will become more apparent from the following description of preferred embodiments, taken in conjunction with the accompanying drawings in which.

DESCRIPTION OF A PREFERRED EMBODIMENT

Figure 1:
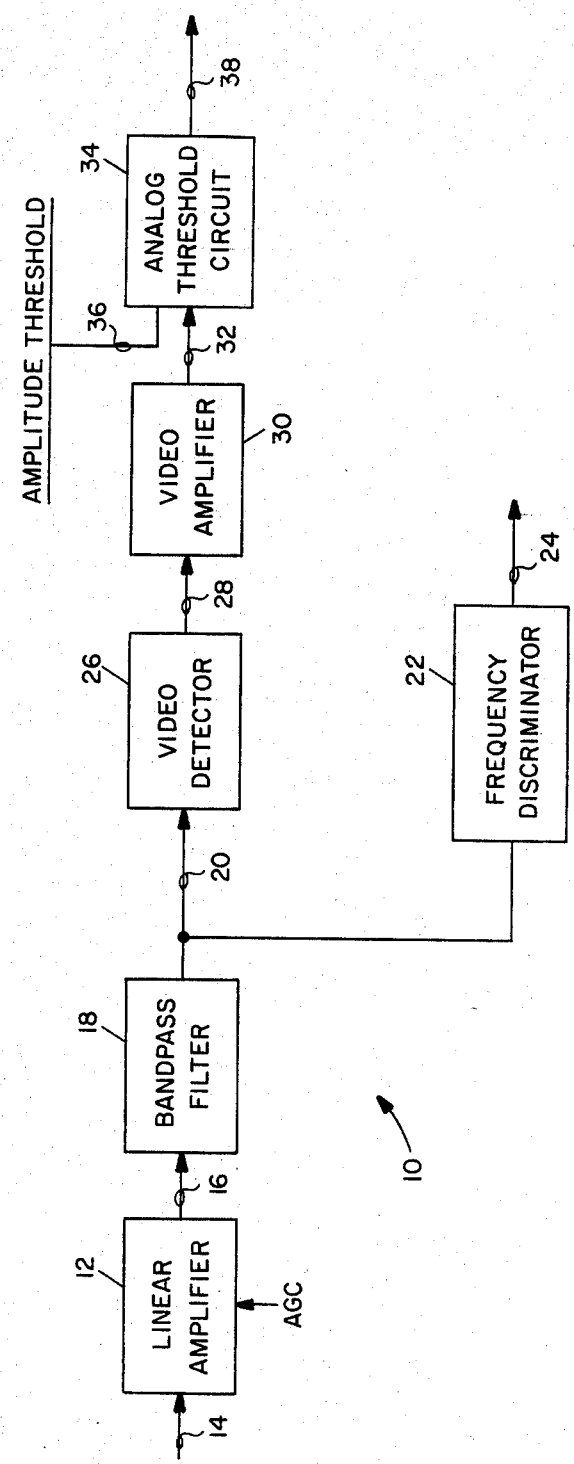
FIG. 1 is a block diagram of a typical linear receiver for measuring amplitude and frequency of a pulsed RF signal.

FIG. 1 is a block diagram of a typical linear receiver 10 in which pulsed RF signals are sorted in frequency by bandpass filtering. The receiver 10 includes a linear amplifier 12 which receives pulsed RF signals 14 and amplifies any of these pulsed RF signals 14 having a frequency within the bandwidth of the linear amplifier 12. Thus, in effect, the linear amplifier 12 both filters and amplifies the pulsed RF signals 14 supplied to it. The pulsed RF output signals 16 of the linear amplifier 12 are supplied to a bandpass filter 18 having a bandwidth narrower than and included in the bandwidth of the linear amplifier 12. The filtered pulsed RF output signals 20 of the bandpass filter 18 are supplied to a frequency discriminator 22 which generates a frequency signal 24 indicating the frequency of the signals 20 supplied to it. The filtered pulsed RF signals 20 are also supplied to a video detector 26 which detects the envelope of the filtered pulsed RF signals 20 to generate output video signals 28 which is supplied to a video amplifier 30. The output video signals 32 of the amplifier 30 are supplied to an analog threshold circuit 34 which is also supplied with an amplitude reference or threshold signal 36. The output signals 38 of the analog threshold circuit 34 correspond to only those portions of the video signals 32 which exceed the amplitude threshold 36.

Figure 2:
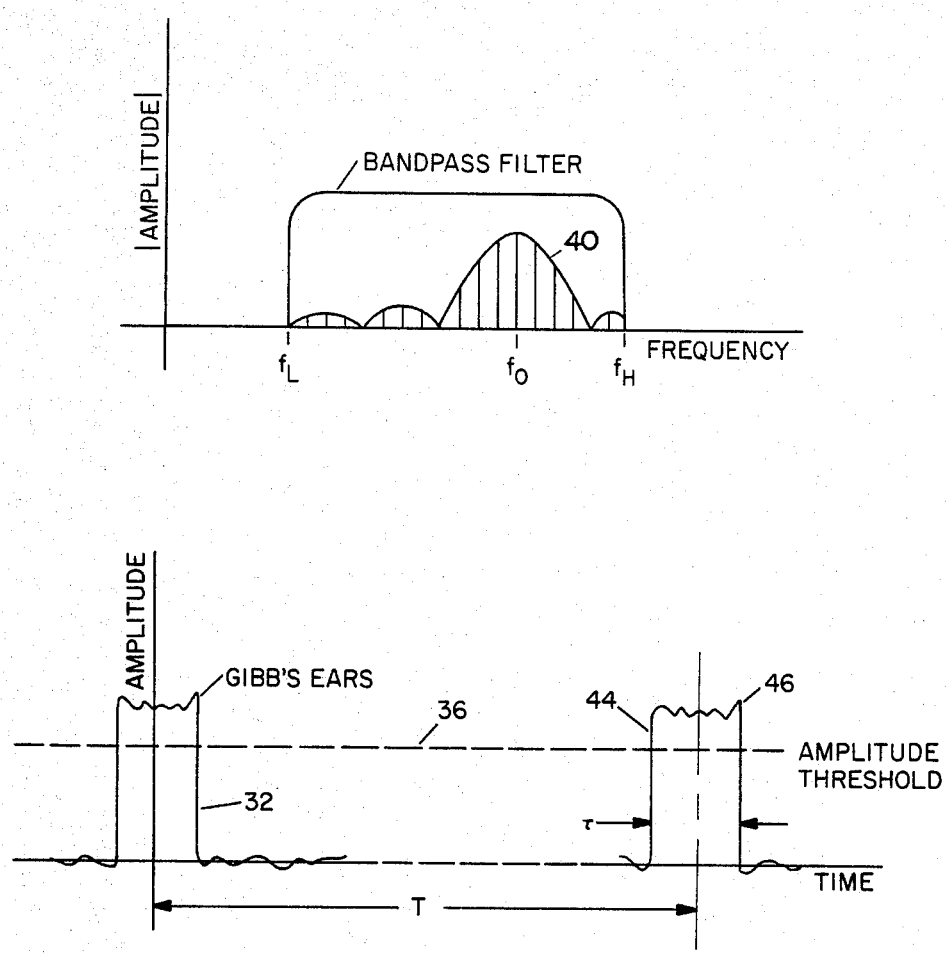
FIG. 2 shows the detected signal waveform and its RF spectrum which is produced by the linear receiver of FIG. 1 for an in-band signal.

FIG. 2 shows the detected signal wave form (video signal 32) and its RF spectrum 40 which will be produced by a low level pulsed RF signal which is within the bandpass 42 of the bandpass filter 18 and which just exceeds the amplitude threshold 36. The analog threshold circuit 34 will produce an output signal 38 corresponding to the upper portions 44 of the video signals 32 above the amplitude threshold 36, and the frequency discriminator 22 will provide a frequency signal 24 that indicates the RF as within the filter bandpass 42. If the received signal waveform is sufficiently narrow and the rise and fall times are fast, then the filter 18 will truncate the pulsed RF signal spectrum, causing Gibb's Ears 46 to appear on the filtered detected waveform 32 as also shown in FIG. 2.

Figure 3:
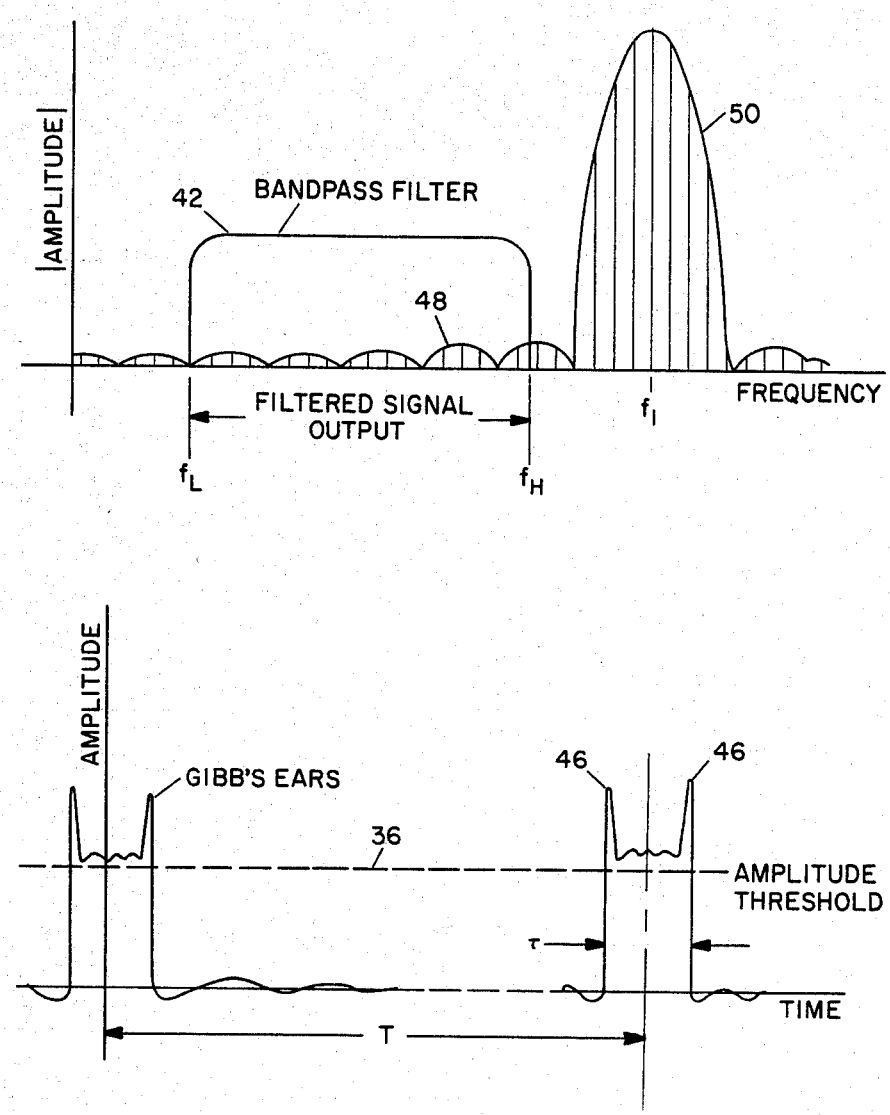
FIG. 3 shows the signal waveform and its RF spectrum produced by the linear receiver of FIG. 1 for a large out-of-band signal.

If the instantaneous dynamic range of the linear receiver 10 is large, frequency sidelobes 48 from large out-of-band pulsed RF signals 50 will appear in the filter bandpass 42, and may have sufficient amplitude to exceed the amplitude threshold 36, as shown in FIG. 3. The center frequency of the out-of-band signal 50 when measured at the input of the filter 18, is at frequency $f_1$. However, at the output of the filter 18, the frequency measured by the frequency discriminator 22 will appear to be within the filter bandpass, around the upper filter frequency cutoff $f_H$. The same is true for large out-of-band signals which are below the filter bandpass 42 except that the frequency discriminator 22 will indicate a frequency within the filter bandpass 42 approximately at the lower filter cutoff frequency $f_L$. Thus, a large out-of-band signal may not be rejected by the bandpass filter 18. It is obvious that improving the filter skirt selectivity will not appreciably improve rejection of out-of-band pulsed RF signals. The only noticeable difference between an in-band pulsed signal and large out-of-band pulsed signal is that larger Gibb's Ears may appear on the detected pulse wave form of the out-of-band signal as also shown in FIG. 3.

Figure 4:
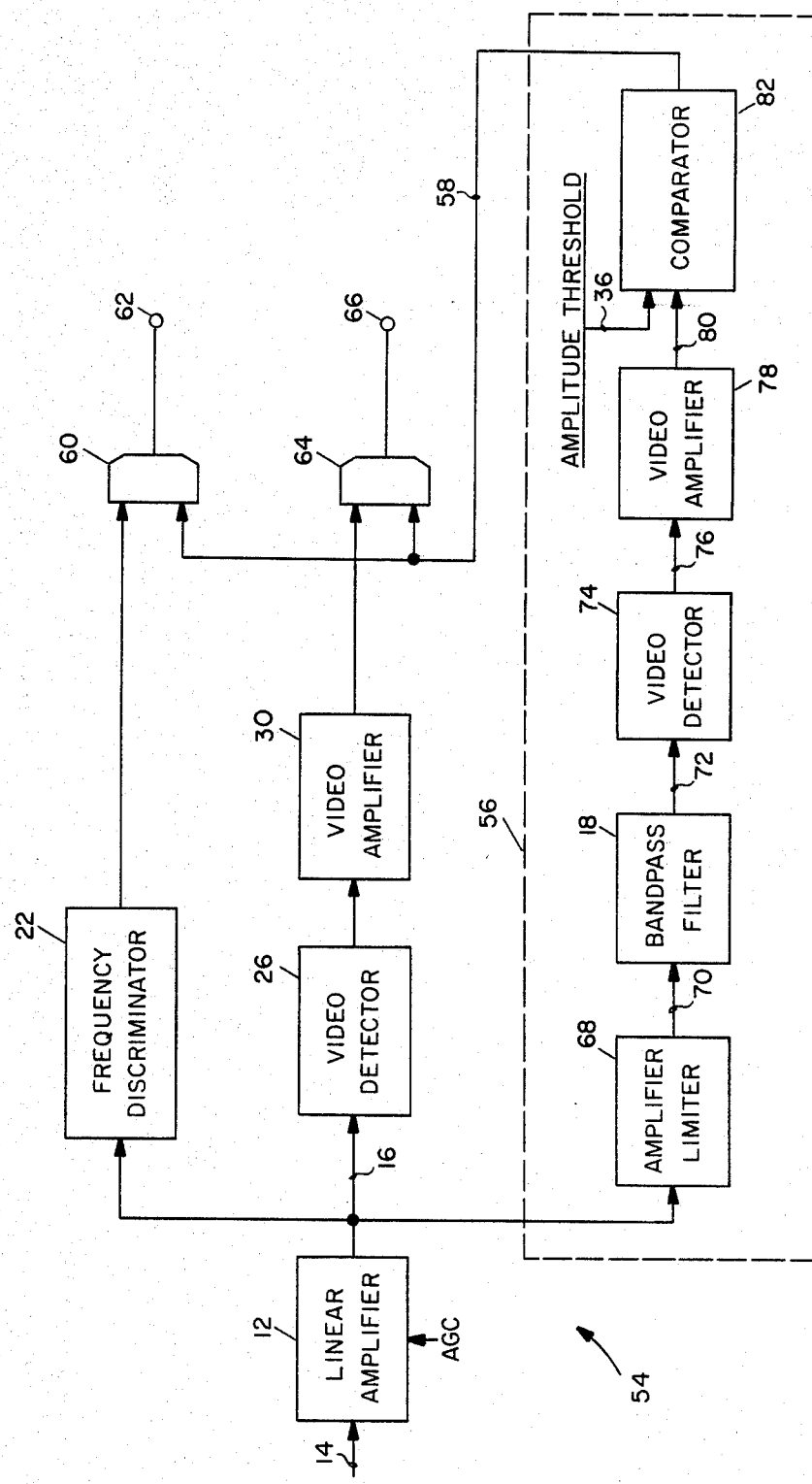
FIG. 4 is a block diagram of a linear receiver channel, according to the invention.

FIG. 4 is a block diagram of a linear receiver 54, according to the invention, which utilizes some of the same circuit elements as those of the linear receiver 10 described above, namely, the linear amplifier 12, the bandpass filter 18, the frequency discriminator 22, the video detector 26, and the video amplifier 30. However, in the linear receiver 54, the pulsed RF output signals 16 of the linear amplifier 12 are supplied directly to the frequency discriminator 22 and the detector 26, and the bandpass filter 18 is disposed in an in-band signal detection circuit 56. The pulsed RF output signals 16 of the linear amplifier 12 are also supplied to the in-band signal detection circuit 56, which generates a gate signal 58 whenever it detects a pulsed RF signal within the bandpass 42 of the bandpass filter 18. The linear receiver 54 also includes a first analog gate 60 connected between the output of the frequency discriminator 22 and a frequency output 62, and a second analog gate 64 connected between the output of the video amplifier 30 and an amplitude output 66. The gates signal 58 generated by the in-band signal detection circuit 56 is supplied to the gate terminals of the two analog gate 60, 64, to render these gates conductive whenever a pulsed RF signal is detected by the in-band signal detection circuit 56.

The in-band signal detection circuit 56 is similar to the well known Dicke Fix receiver, and includes an amplifier limiter 68 for converting the pulsed RF output signal 16 of the linear amplifier 12 into hard-limited pulsed RF signals 70 having either a first or second instantaneous value, the bandpass filter 18 for filtering the hard-limited pulsed RF signals 70 and passing any hard-limited pulsed RF signal 72 within the filter bandpass 42, and a video detector 74 for detecting the envelope of the filtered hard-limited pulsed RF signals 72 to generate output video signals 76. The video signals 76 are amplified by a video amplifier 78, and the amplified video signals 80 are supplied to a comparator 82, which compares these video signals 80 with the amplitude threshold signal 36 which is also supplied to the comparator 82, and generates the gate signal 58 whenever the video signals 80 exceeds the amplitude threshold signal 36.

The conversion of all pulsed RF signals 16 into signals of equal magnitude by the amplifier limiter 68 assures that any frequency sidelobes from out-of-band pulsed RF signals which appear in the filter bandpass 42 will have a much lower magnitude than that of in-band pulsed RF signals. Thus, an amplitude threshold value 36 can be selected so that it is always less than the detected waveform 80 resulting from an in-band pulsed RF signal and always more than the detected waveform 80 resulting from an out-of-band pulse RF signal. Furthermore, the frequency discriminator 22 will always measure the correct frequency whenever an amplitude detect is made.

To best explain the operation of the linear receiver 54, a design example is given below of a receiver that was built and tested over a 60 dB dynamic range. Tests on this circuit show that the amplitude detection occurs only when the pulsed RF signal is within a 2 dB bandpass of the filter 18 over the entire 60 dB of instantaneous signal dynamic range. The approximate parameters used for the tests were:

linear amplifier 12 bandwidth, $B_w$ equals 500 MHz
bandpass filter 18 bandwidth $B_n$ equals 125 MHz
frequency discriminator 22 bandwidth equals 125 MHz
video bandwidth is greater than $1/\gamma$ where $\gamma$ is the shortest received pulse width.

When the gain of the in-band signal detection circuit is made sufficiently high to limit on noise, a DC level is seen at the output of the video amplifier 78 which has noise component superimposed on it. The DC level is equal to $$DC = K\sqrt{\frac{B_n}{B_w}},$$

where K is a proportionality constant.
Assuming K is equal to 1 in this example, $$DC = \sqrt{\frac{125}{500}} = \sqrt{0.25} = 0.5 \text{ volts}$$

The largest level that can appear at the video output is 1 volt when an RF signal greater than noise is in the filter bandpass 42. Therefore, the dynamic range of the in-band signal detection circuit 56 for in-band signals is approximately 2 to 1. If the out-of-band comparator threshold 84 is set for the proper probability of false alarm (for this example 0.75 volts is assumed), then in-band signals can readily exceed this threshold. Since in-band and out-of-band signals are normalized to the limit level prior to bandpass filtering, the voltage out of the filter 18 will be below the comparator threshold 84 when the pulsed RF signal, in this example, is approximately at or outside of the 2 dB bandwidth of the bandpass filter. Thus, by using the in-band signal detection circuit 56 to gate the frequency and amplitude outputs of the linear receiver 54, only signals within the 2 dB filter bandpass will be passed and large out-of-band signals will be rejected.

Since various modifications, variations, and additions to the specific embodiment of the invention described herein are possible, it is intended that the scope of the invention be limited only by the appended claims.

What is claimed and desired to be secured by Letters Patent of the United States is:

1. A receiver, comprising:
   input means for filtering pulsed RF signals and passing any pulsed RF signals which are within a first selected frequency band;
   signal limiting means for converting said filtered pulsed RF signals into hard-limited pulsed RF signals having either a first or second instantaneous value;
   bandpass filter means for filtering said hard-limited pulsed RF signals and passing any hard-limited pulsed RF signals within a second selected frequency band which is narrower than, and included within, said first frequency band;
   first detector means for detecting the envelope of said filtered hard-limited pulsed RF signals passed by said bandpass filter means and generating first video signals;
   signal comparator means for comparing said first video signals with a selected threshold value and generating a gate signal whenever said first video signals exceeds said threshold value;
   first switching means, which is controlled by said gate signal and which is closed or rendered conductive upon receipt of said gate signal;
   second detector means, connected in series with said first switching means between said input means and a first output of the receiver, for detecting the envelope of said filtered pulsed RF signals passed by said input means and providing second video signals at the receiver first output whenever said first video signals exceed said threshold value.

2. A receiver, as described in claim 1, wherein said selected threshold value is greater than the maximum first video signals which can be generated from pulsed RF signals outside said second frequency band and is less that the maximum first video signals which can be generated from pulsed RF signals within said second frequency band.

3. A receiver, as described in claim 1, wherein said input means comprises a linear amplifier for amplifying pulsed RF signals within said first frequency band.

4. A receiver, as described in claim 1, which further comprises a video amplifier for amplifying said first video signals supplied to said signal comparator means.

5. A receiver, as described in claim 1, which further comprises a video amplifier for amplifying said second video signals supplied to said receiver first output.

6. A receiver, as described in claim 1, wherein said first switching means is disposed between said second detector means and said receiver first output.

7. A receiver, as described in claim 1, which further comprises:
   second switching means, which is controlled by said gate signal and which is closed or rendered conductive upon receipt of said gate signal; and
   frequency discriminator means, connected in series with said second switching means between said input means and a second output of the receiver, for generating a frequency signal indicating the frequency of said filtered pulsed RF signals passed by said input means and providing said frequency signal at the receiver second output whenever said first video signals exceed said threshold value.

8. A receiver, as described in claim 7, wherein said second switching means is disposed between said frequency discriminator means and said receiver second output.

9. A method for receiving pulsed RF signals, comprising the steps of:
   filtering said signals to pass pulsed RF signals which are within a first selected frequency band;

converting said filtered pulsed RF signals into hard-limited pulsed RF signals having either a first or second instantaneous value;

filtering said hard-limited pulsed RF signals to pass any hard-limited pulsed RF signals within a second selected frequency band which is narrower than and included within said first frequency band;

detecting the envelope of said filtered hard-limited pulsed RF signals to generate first video signals;

comparing said first video signals with a selected threshold value; and as a result of said comparing step, detecting the envelope of said filtered pulsed RF signals produced in the first filtering step whenever said first video signals exceeds said threshold value, to generate output video signals of the receiver.

10. A method, as described in claim 9, wherein said threshold value is selected to be greater than the maximum first video signals which can be generated from pulsed RF signals outside said second frequency band and to be less than the maximum first video signals which can be generated from pulsed RF signals within said second frequency band.

11. A method, as described in claim 9, wherein said first filtering step comprises the step of amplifying pulsed RF signals which are within said first frequency band.

12. A method, as described in claim 9, which further comprising the step of amplifying said first video signals before comparing said first video signals with said threshold value.

13. A method, as described in claim 9, which further comprising the step of amplifying said output video signals.

14. A method, as described in claim 9, which further comprises the step of generating an output frequency signal indicating the frequency of said filtered pulsed RF signals produced in the first filtering step whenever said first video signals exceed said threshold value.

* * * * *

UNITED STATES PATENT OFFICE
CERTIFICATE OF CORRECTION

Patent No. 4,535,460             Dated  August 13, 1985

Inventor(s)  John O. Wedel, Jr.

It is certified that error appears in the above-identified patent and that said Letters Patent are hereby corrected as shown below:

Title page:

Item 73 to read:

--[73] Assignee: United States of America as represented by the Secretary of the Army, Washington, D.C.--

Signed and Sealed this

Seventeenth Day of December 1985

[SEAL]

Attest:

DONALD J. QUIGG

Attesting Officer    Commissioner of Patents and Trademarks